Patented Apr. 17, 1951

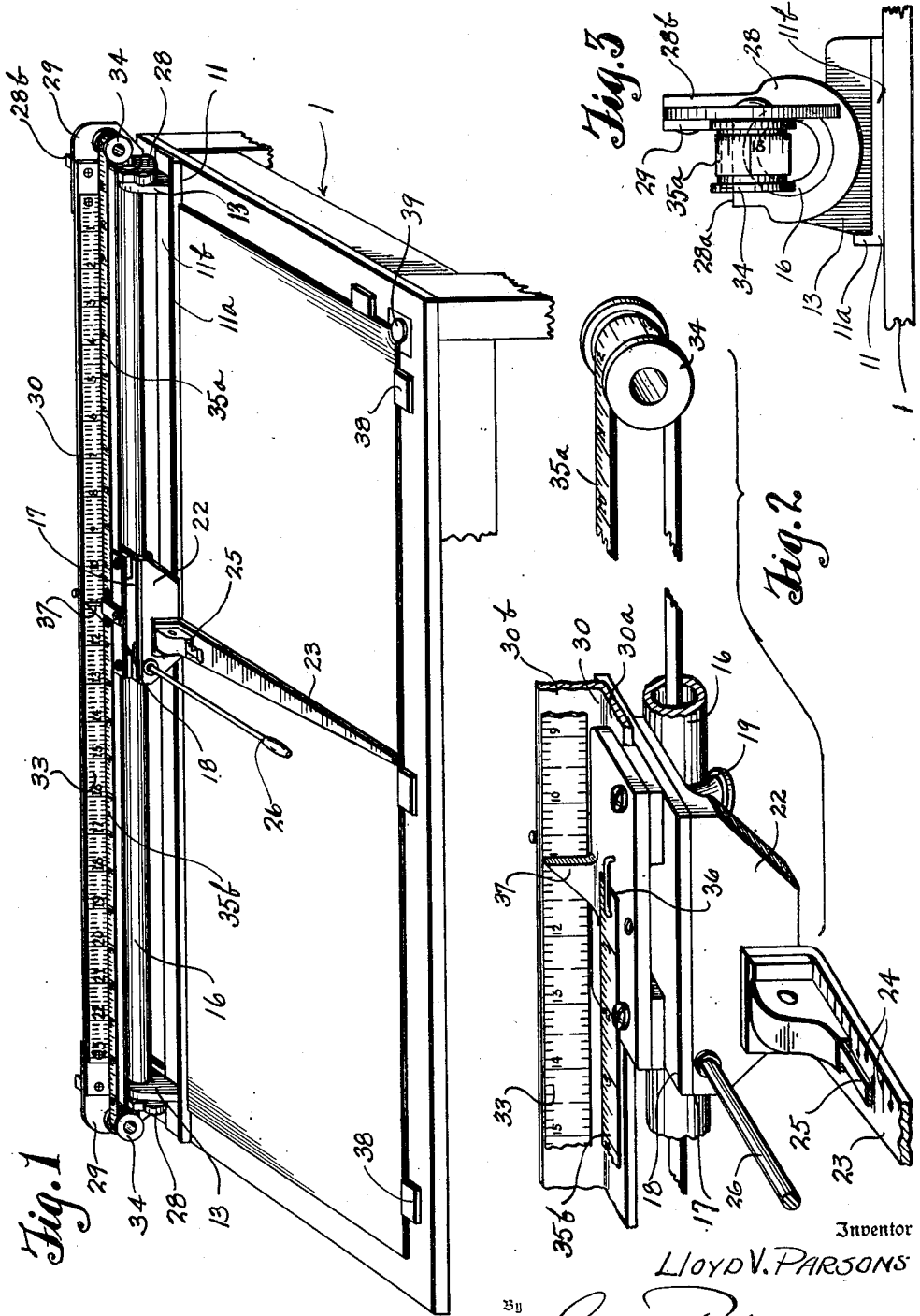

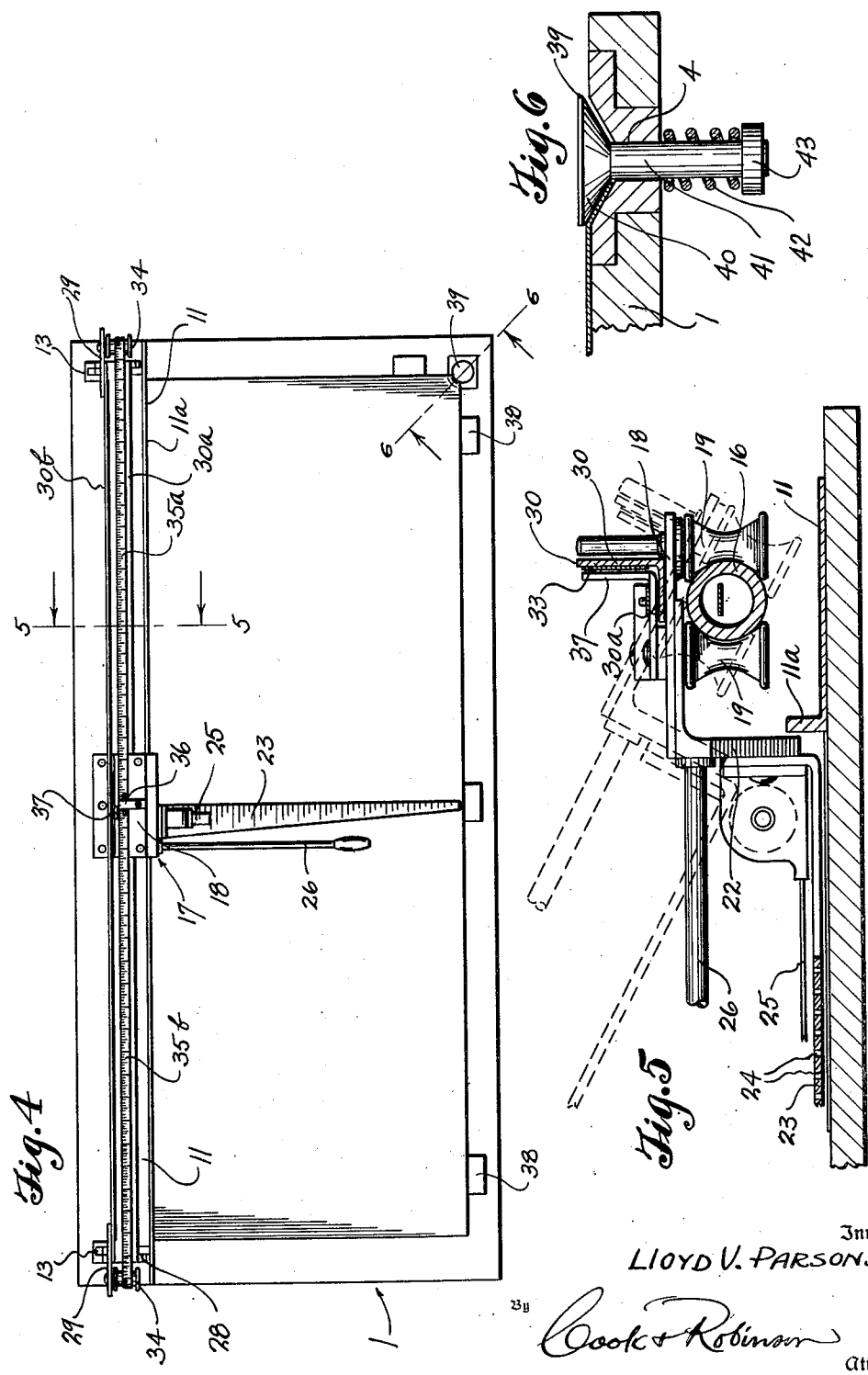

2,549,634

UNITED STATES PATENT OFFICE 2,549,634

LAYOUT AND MEASURING DEVICE

Lloyd V. Parsons, Seattle, Wash.

Application January 17, 1949, Serial No. 71,367

3 Claims. (Cl. 33—76)

This invention relates to a layout and measuring device or instrument to be used, for example, by sheet metal workers, draftsmen and the like. More particularly, the invention has reference to a device for laying out work on sheet material and which may be readily secured upon the top surface of a work bench, or table, and which includes means for making rapid calculations and measurements of distances in a longitudinal and/or transverse direction, and means for the scribing of transverse or longitudinal lines at measured distances on the sheet material.

It is the principal object of the present invention to provide a simplified and accurate means for the rapid scribing on a sheet of flat material the necessary lines, or markings along which the material is to be cut, folded or crimped for the making of articles therefrom.

Another object of the invention is to provide a device of the above character including a novel combination of tape lines whereby calculations may be rapidly made in determining spacings of lines or marks in making a layout.

Still another object of this invention is to provide a layout device comprising a fixed guide member and a carriage that is readily movable therealong and equipped with an arm for use in measuring and serving as a straight edge or as a holder for a scribing tool, thus to facilitate the making of longitudinal or transverse lines.

A further object of this invention is to so mount the carriage that it may be easily and readily rotated about the guide member, thus to permit the scribing arm, as extended therefrom, to be raised to a position clear of the table surface on which the sheet material is placed.

A still further object of the invention is to provide apparatus of the above kind including also means for the rapid calculation of increases or decreases in transverse measurements, that is, in measurements along the arm.

A still further object of the invention is to provide instrumentalities whereby workmen are enabled to do accurate work, with a minimum amount of physical or mental effort and in a minimum time.

Other objects of the invention reside in the details of construction of the parts embodied in the device, in their combination, mode of use and operation, as will hereinafter be fully described.

In accomplishing the above mentioned and other objects of the invention, I have provided the improved details of construction, the preferred forms of which are illustrated in the accompanying drawings, wherein:

Fig. 1 is a perspective view of a device embodied by the present invention as assembled and as functionally secured to the top surface of a work bench.

Fig. 2 is a perspective view of the carriage and a portion of the guide member on which it is mounted, showing also parts of the graduated tapes used in the rapid calculation of and in making measurements.

Fig. 3 is an elevation of a support at one end of the guide member, and the means to which one of the mounting wheels for the movable tape is applied and to which one end of the stationary tape is secured.

Fig. 4 is a top, plan view of the table and present apparatus, illustrating the sheet aligning stops or blocks and sheet securing means at the forward edge of the work bench.

Fig. 5 is a cross-sectional view taken approximately on line 5—5 in Fig. 4, and indicating in dotted lines the raising of the calibrated arm.

Fig. 6 is a cross-sectional view, on line 6—6 in Fig. 4, showing the clamp bolt for holding the sheet material in a set position.

The present invention is a layout and measuring device, designed especially for the use of sheet metal workers, draftsmen, and other persons, for the marking or scribing of longitudinal and transverse lines on a large piece of sheet material. Preferably the device is fixedly secured upon a table top or work bench, along the rear or back edge thereof, as seen in Figs. 1 and 4.

The device comprises an elongated metal base plate, to the opposite ends of which brackets are securely affixed. The brackets rigidly support a straight, round guide rod. Mounted on the guide rod and movable therealong, is a carriage, and permanently secured to the carriage, at a right angle to the guide rod, is a scaled measuring arm which serves as a means for making transverse measurements, also, as a straight edge for the scribing of transverse lines, and as a holder for a pointed scribing instrument in the making of longitudinal lines.

Secured to the top of the carriage plate and extending in opposite directions therefrom are two movable, scaled tapes which extend the full length of the guide member. These tapes, used in conjunction with the stationary tape, provide the means for rapidly calculating an increase or decrease in either longitudinal direction from a given point.

Referring more in detail to the drawings:

In Fig. 1, I have illustrated the present layout and measuring device in its preferred form of construction. It is shown as being secured in a fixed position upon a work bench, designated in its entirety by numeral 1. The device comprises a steel base plate 11, which preferably comprises a piece of angle iron or the like, that extends the full length of the device. The vertical flange 11a of the base plate is in parallel alignment with the longitudinal edges of the bench and provides a stop against which an edge of the sheet material to be worked on may be abutted if desired. The horizontal flange 11b of the base bar is fixed to the bench, preferably adjacent its back edge.

Securely affixed on the base plate 11, at its opposite ends, are upstanding supports 13—13. The upper portions of these supports are formed with openings through which the opposite end portions of a straight, tubular guide rod 16 are extended and fixed to hold the guide firmly in place. The guide member, in a preferred form, comprises a rigid piece of round pipe, or tubing, open from end to end and which is approximately the same length as the base plate 11. The diameter of such a guide rod or member would be varied in accordance with change in its length, or as desired or as required for sufficient rigidity.

Mounted by and overlying the guide member 16, and movable therealong, is a carriage, designated in its entirety by numeral 17. This carriage comprises a rectangular metal top plate 18, overlying the guide rod 16, and on the under side of which plate four rollers 19 are vertically mounted. The rollers are situated at the respective corners of the plate 18 and are so placed that they will engage in rolling contact with opposite sides of the guide member for the support and guided travel of the carriage thereon as understood by reference to Fig. 5. It is necessary that the rollers firmly engage the guide member but the frictional engagement should not be such as to restrict the manual movement of the carriage along the guide, or its rotation on the guide member when this is desired.

At the forward edge of plate 18 is a depending flange or wall 22, to which a scaled measuring arm 23 is rigidly attached. This arm projects at right angle to the guide 16 and should extend substantially to the forward or front edge of the work bench 1. In use, it lies flatly upon the sheet material. The measuring arm has a straight scribing edge, and is formed therealong with holes 24 at the various scaled intervals, to the full length of the arm as in Fig. 2. The purpose, use and function of this arm will later become readily apparent when more fully described. Also rigidly secured to the flange 22 of the carriage, directly above the point of attachment of the arm 23, is a spring-wound, metal, scaled tape 25 which may be readily drawn out and extended along the arm as presently explained. A handle 26 is secured rigidly to the flange 22 to provide a convenient means for movement of the carriage along the guide member by a workman standing in front of the bench.

Rotatably mounted upon the opposite end portions of the guide rod 16, and outside of the supports 13—13, are brackets 28, each formed with an upwardly facing shoulder 28a and an upwardly projecting back brace 28b which is at right angle to the face of the shoulder. Rigidly affixed to the faces of the back braces 28b and extended to both sides thereof, are metal plates 29. Extended the length of the guide, and secured at its ends to the inner end portions of the plates 29, is a rigid angle bar 30. The horizontal flange 30a of the bar rests at its ends upon the bracket shoulders 28a, and a scaled metal tape 33 is affixed to the vertical portion 30b of the angle bar. This metal tape, which extends the full length of the bar, is graduated in inches from the right-hand end, as is illustrated in Fig. 1. Mounted on the outer end portions of the metal plates 29 are horizontal rollers 34, the function of which will be presently described.

It is observed by reference to Fig. 5, that the horizontal flange of the bar 30 lies flatly upon the carriage plate 18 in such relationship that the swinging of the carriage about the axial line of the tubular guide rod will cause a corresponding turning of the bar 30 about the axial line of the guide rod. Thus the relationship of bar and carriage is maintained regardless of the position of the scribing arm.

Attached to and extending from the center of the carriage 17, in opposite directions, are two metallic tapes 35a and 35b which rest upon the horizontal flange 30a of the angle bar 30 and are each scaled in inches from their point of juncture 36. The tapes 35a and 35b extend in opposite directions from the carriage and are passed about the rollers 34 at the opposite ends of the tubular guide 16 and are projected into the open ends and are connected one to the other in the interior of the guide member by a resilient means such as coiled spring, not shown, to maintain tension upon the tapes.

Affixed to the top of the carriage near the back edge thereof is a pointer or indicator 37 which is perpendicular to the carriage top, parallel and close to the tape 33. This is aligned with the straight edge of the arm 23 and its purpose is to aid the user of the device in ascertaining a specific point or measurement on the tape 33 as presently explained.

Along the top of the work bench 1 near the forward edge thereof, alignment blocks 38 or stops are provided, against which the forward edge of the sheet material to be worked upon may be abutted as shown in Fig. 1. These blocks are located with their edges registering with a line that is exactly parallel with the forward edge of the angle bar 11 and guide 16.

Located at the forward right-hand corner of the work bench, as illustrated in Figs. 1 and 4, is a securing means or clamp bolt which is designated in its entirety by numeral 39. This clamp bolt is illustrated in detail in Fig. 6. It is preferred that a flat head bolt be used which is tapered on the under side of the head 40 to the shank 41. The bolt is projected through a hole 4 in the work bench and the hole is countersunk to permit the head of the bolt to be flush with the top surface of the work bench. Applied to the portion of the shank 41 which extends below the under side of the work bench is a strong helical spring 42. The spring is retained thereon by means of a collar 43. The collar is retained on the shank by riveting and enlargement of the end of the shank.

To facilitate the making of measurements by use of the graduations on the arm, the graduations start at a point thereon that is aligned with the lower edge of the sheet material when it is in place against the stops.

The layout device, having been constructed and assembled as hereinbefore described, may be readily used to accomplish its various objectives and functions. The sheet material to be worked upon is disposed on the work bench surface and preferably is registered against the alignment blocks 38 as in Fig. 1. A corner of the sheet material is then held as in Fig. 6 by the clamp bolt 39 so as to maintain the material in a specific position against movement under pull of a scribing stylus. The horizontal measuring arm 23 may be used to inscribe rapid and accurate markings or lines both longitudinally and transversely upon the material. If it is desired to make a longitudinal line, a marking instrument or stylus may be projected through a selected hole 24 at a specific point of the arm and the carriage 17 may be readily moved along the guide member 16 to cause a line to be scribed on the material. The right-hand edge of the arm 23 may also be used as a straight edge for the purpose of scribing the transverse lines or markings on the material.

The graduated scale of the measuring arm may be used in combination with the similarly graduated steel tape 25 to make calculations and to determine new positions where it is desired to make lines or marks. To accomplish this objective, the workman may start from a given point on the measuring arm, for example at the 5 and 3/8 inch mark, and may desire to add thereto a distance of $2\frac{3}{16}$ inches. To find the new position by a rapid and easy means, the zero mark of the tape 25 is registered with the mark of 5 3/8 inches on the measuring arm, and then referring to the tape, the location of the $2\frac{3}{16}$ inches mark is noted and the mark on the measuring arm that is aligned therewith is where the next mark or line is to be made. When the tape 25 is not in use, it will be rewound and held out of the way by its spring mechanism. If the measuring arm is not to be utilized, it may be swung upwardly to a position out of the way, as is indicated in Fig. 5. This is accomplished by swinging the handle lever upwardly and rearwardly, thus causing the rollers 19 to slide about the tubular guide member 16.

Longitudinal measurements on the sheet material may be made by employing the combination of the movable tapes 35a and 35b and the stationary tape 33. For example, if the workman has the carriage pointer 37 at a specified point with reference to tape 33 and desires to add to or subtract therefrom, it is relatively simple to locate the new position by first locating the mark, designating the amount of change, on the proper movable tape and then moving the carriage to the point on the stationary tape that, before movement, registered with that point on the movable tape. This means of measurement and calculation is especially helpful and expedient when dealing with irregular fractions of an inch.

It is to be understood that the device as herein described may be readily altered or adapted to different uses without departing from the invention disclosed. The rollers which engage the guide members may, if desired, be replaced by ball bearings and the brackets and carriage may be modified in design and construction without departing from the main objectives and uses of the device. The invention basically resides in the combination of table, the several measuring means and their interrelationship with the movable carriage and its scribing and measuring arm.

Having thus described my invention, what I claim as new therein and desire to secure by Letters Patent is:

1. A layout device of the character described comprising a work table on which a sheet of material can be flatly supported, a guide rod fixedly mounted on the table along one side thereof, brackets mounted on the guide rod at its ends for axial turning thereon, a scale bar extending along the guide rod parallel thereto and fixed at its ends to said brackets for support thereby, a carriage mounted for travel on the guide rod and for rotation about its axial line and having a sliding connection with the said bar whereby rotation of the carriage on the guide rod will cause a corresponding turning movement of the scale bar about the rod, an arm, having a straight scribing edge, rigidly fixed to and extending from the carriage and adapted to be laid flatly upon and across a sheet of material on said table, a graduated scale applied to and extending along the scale bar, a pointer on the carriage adapted to follow the said scale, rollers supported from the opposite ends of the scale bar and a continuous tape belt drawn taut about and extended between the rollers and fixed at one point to the carriage to cause it to move therewith; said belt being graduated in opposite directions from a point therein that is aligned with the scribing edge of the said arm.

2. A device as recited in claim 1 wherein the said guide rod is tubular and said rollers as mounted at the opposite ends of the said scale bar are so disposed beyond the ends of the tubular guide rod that the lower run of the tape belt passes freely therethrough.

3. A device as recited in claim 1 wherein the said guide rod is tubular, and said scale bar is of angle iron form, and so disposed that one flange is normally horizontal and one is normally vertical, and said rollers as mounted at the ends of said bar are so disposed that the lower run of said tape belt passes freely through the tubular guide, and the portions of the top run at opposite sides of the carriage lie flatly upon the horizontal flange of the said tape bar, and the graduations of said bar are applied to the vertical flange.

LLOYD V. PARSONS.

REFERENCES CITED

The following references are of record in the file of this patent:

UNITED STATES PATENTS

| Number | Name | Date |
| --- | --- | --- |
| 530,111 | Krebs | Dec. 4, 1894 |
| 534,865 | Dolen | Feb. 26, 1895 |
| 935,014 | Green et al. | Sept. 28, 1909 |
| 1,570,150 | Hinds | Jan. 19, 1926 |
| 1,736,342 | Geihler | Nov. 10, 1929 |
| 2,185,443 | Kreutz | Jan. 2, 1940 |
| 2,191,109 | Kittredge | Feb. 20, 1940 |
| 2,479,511 | Pratt | Aug. 16, 1949 |

FOREIGN PATENTS

| Number | Country | Date |
| --- | --- | --- |
| 438,807 | Germany | Dec. 26, 1929 |